United States Patent [19]

Turillon et al.

[11] 4,134,490

[45] Jan. 16, 1979

[54] GAS STORAGE CONTAINMENT

[75] Inventors: Pierre P. Turillon, Ramsey; Gary D. Sandrock, Ringwood, both of N.J.

[73] Assignee: The International Nickel Company, Inc., New York, N.Y.

[21] Appl. No.: 881,030

[22] Filed: Feb. 24, 1978

[51] Int. Cl.² .................. F17C 11/00; C01B 1/26; B65D 25/00; F16L 55/04

[52] U.S. Cl. .................................... 206/0.7; 34/15; 62/48; 138/26; 138/28; 220/88 R; 423/248; 423/648 R

[58] Field of Search ............... 206/0.7, 0.6; 220/88 R, 220/3; 423/248, 648; 55/523; 34/15; 62/48; 138/26, 28

[56] References Cited

U.S. PATENT DOCUMENTS

| 1,058,572 | 4/1913 | Finlay | 138/28 |
|---|---|---|---|
| 1,799,803 | 4/1931 | Miller | 206/0.7 |
| 2,928,529 | 3/1960 | Grosse et al. | 206/0.6 |
| 3,315,479 | 4/1967 | Wiswall, Jr. et al. | 34/15 |
| 3,375,676 | 4/1968 | Reilly, Jr. et al. | 34/15 |
| 3,430,659 | 3/1969 | Henderson | 138/26 |
| 3,508,414 | 4/1970 | Wiswall, Jr. et al. | 62/48 |
| 3,516,263 | 6/1970 | Wiswall, Jr. et al. | 62/48 |
| 3,922,872 | 12/1975 | Reilly et al. | 423/248 |
| 3,931,395 | 1/1976 | Beckert et al. | 423/648 |
| 4,085,590 | 4/1978 | Powell et al. | 34/15 |

Primary Examiner—William T. Dixson, Jr.
Attorney, Agent, or Firm—E. C. MacQueen; Francis J. Mulligan, Jr.

[57] ABSTRACT

Discloses the use of spatially extended particles of a solid characterized by a low apparent density distributed within a mass of metal hydride material used in a pressure vessel for storing hydrogen.

5 Claims, 3 Drawing Figures

GAS STORAGE CONTAINMENT

BACKGROUND OF THE INVENTION

Hydrogen is stored conventionally as a gas in steel cylinders at high pressures (e.g., 2,000 psi) and at lower pressures as a liquid in insulated containers. Both methods of storage require comparatively bulky storage containers. In addition to their unwieldy size, such containers are inconvenient due to the high pressure required for gas storage in cylinders and the ever present danger of gaseous hydrogen evolving from boiling-off of the liquid form.

Within recent years, considerable attention has been focused on the storage of hydrogen as a metallic compound, or hydride, of various substances. Metal hydrides can store large amounts of hydrogen at low and even sub-atmospheric pressures in relatively small volumes. This low pressure storage of hydrogen is relatively safe and allows the construction of hydrogen containers having forms significantly different than those presently known.

Hydridable metals are charged with hydrogen by introducing pressurized gaseous hydrogen into valved containers. The hydrogen gas reacts exothermically with the metal to form a compound. Discharging of the metal hydride is accomplished by opening the valve of the container, to permit decomposition of the metal hydride, an endothermic reaction. It has been found expedient when gas is desired from the storage vessel to heat the storage vessel thereby increasing the flow of hydrogen or providing hydrogen at pressures substantially above atmospheric.

During the adsorption/desorption process, the hydridable metal has been found to expand and contract as much as 25% in volume as a result of hydrogen introduction and release from the metal lattice. Such dimensional change leads to fracture of the metal powder particles into finer particles. After several such cycles, the fine powder self-compacts causing inefficient hydrogen transfer. Additionally, and of even greater significance, high stresses due to the compaction of the powder and expansion during hydride formation are directed against the walls of the storage container. The stress within the powder has been observed to accumulate until the yield strength of the container is exceeded whereupon the container plastically deforms, buckles or bulges and eventually ruptures. Such rupture is extremely dangerous since a fine, often pyrophoric powder is violently expelled by a pressurized, flammable hydrogen gas. Small, experimental cylinders of the aforedescribed type have indeed been found to burst when subjected to repetitive charging/discharging conditions.

The problem of expansion and compaction has been recognized in the art to the extent that containers are only partially filled with hydridable metal powders. The problem of hydridable metal powder particle breakdown has been addressed in U.S. Pat. No. 4,036,944 wherein a thermoplastic elastomer binder is used to form pellets of the hydridable metal particles. Although this provides a solution to a portion of the problem of hydrogen storage, polymers are notoriously poor heat conductors, are subjected to thermal deterioration, and may be detrimentally affected by hydrogen. Since heat is generated during hydrogen charging and since heat may, in many cases, be added during discharging, such polymer containing pellets appear to be only partially useful under somewhat restrictive operational conditions.

DISCOVERY AND OBJECTS

It has now been discovered that by means of a novel combination difficulties and disadvantages as hereinbefore described can be averted.

It is an object of the present invention to provide a novel gas-storage means.

BRIEF DESCRIPTION OF THE DRAWING

Other objects and advantages will become apparent from the following description taken in conjunction with the showing in which.

GENERAL DESCRIPTION

Generally speaking the gas-storage means of the present invention comprises a valved pressure vessel containing particles of solid which are capable of combining with gas, for example, metals and metal compounds which form hydrides and which change in volume during gas charging and discharging. Dispersed among the particles of this first solid are particles of a second solid characterized by a spatially extended particle structure encompassing free space. Generally, particles of such a second solid exhibit an apparent density, when deposited under the force of gravity through a free fall of less than an inch into a container of specified volume, of no more than 30% of the theoretical density of the material from which this second solid is made. For purposes of this specification and claims, the conditions of packing resulting from such deposition into a container of specified volume under the force of gravity through a limited free fall for example, as spcified ASTM B 329-76, are conditions under which apparent density is measured. The second particulate solid occupies about 5% to about 40% of the total volume occupied by (A) the first particulate solid measured in the gas-charged condition and (B) the second particulate solid measured under conditions under which apparent density is measured. This total volume (A+B) is no greater than 75% of the volume of the pressure vessel.

DESCRIPTION OF THE DRAWINGS

Figure 1:
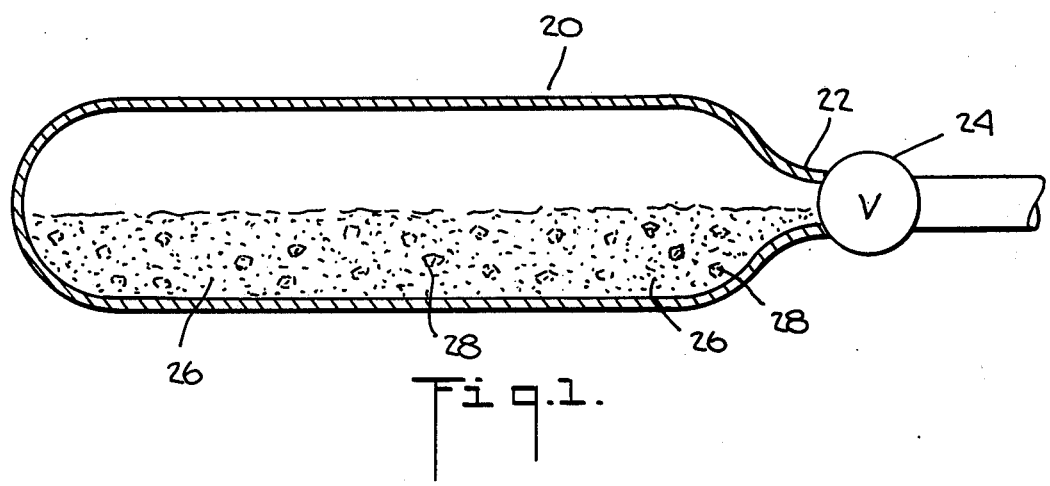
FIG. 1 shows in cross-section a gas-storage means of the present invention.
Figure 2:
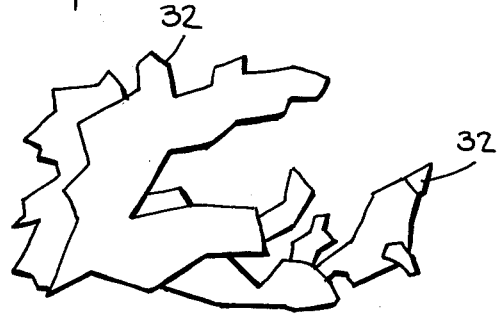
FIG. 2 shows, greatly enlarged, an outline of a metal particle used in the gas storage means depicted in FIG. 1.

Referring now to FIG. 1 of the drawing, pressure vessel 20 having port 22 and valve 24 contains first particulate solid 26 comprising particles of hydridable metal and second particulate solid 28. Second particulate solid 28 can be any of a number of metal powders such as INCO ® nickel powders types 255, 270 or 287. These nickel powders have spatially extended structures in chain form and have apparent densities of about 0.4 to 1 g/cc (i.e., 4.5% to 11.2% of theoretical density). INCO nickel powder type 270 is of particular advantage for the purposes of the present invention in that in addition to being in chain form it is also highly spiky as depicted in greatly enlarged form in FIG. 2. Those skilled in the art will appreciate that a chain-like array of irregularly shaped particles makes it very difficult to determine an average particle size. Measurements on the Fisher Sub-Sieve Sizer for nickel powder types 255, 270 and 287 indicate an equivalent mean particle size of less than 5 micrometers ($\mu$m). Numerous other examples of powders of spatially extended structure suitable for use in the present invention will be apparent to those skilled in the art. For example, dry diatomaceous earth, lignin, compacted metal whiskers, Kieselguhr, nickel or other metal resulting from alkali extraction of Raney alloys, open cell foam plastics, and foamed metals all have the required structure. On the other hand, sand-like particles which close pack under gravity and metal powders made by condensation or fragmentation from the liquid state and which tend to be generally spherical are not suitable.

Figure 3:
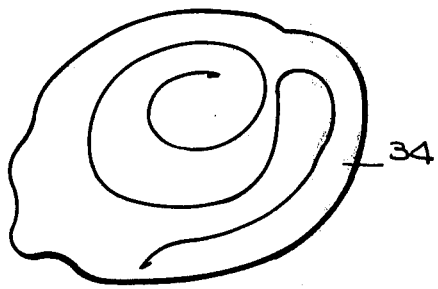
FIG. 3 shows a crumpled piece of foil which also can be used in the gas storage means depicted in FIG. 1.

At a different order of magnitude in size, crumpled up metal foil 34, e.g., aluminum as depicted in FIG. 3, as well as fragmented turnings can be used as the second particulate material. In each instance, the second particulate material, by its particle configuration provides free space for expansion of the first particulate material under pressures which are lower than the pressure which will cause plastic deformation of the walls of pressure vessel 20.

While the present invention has been described with respect to hydrogen storage, it will be appreciated that the invention is not limited to storage usage but is applicable for whatever purpose metal hydrides are formed and decomposed within a containing vessel. In addition, the invention is not limited to hydrogen but is applicable to any gas which reacts reversibly with any solid to form products with volume changes. For example, the invention is applicable to processes involving the formation of ammines using metal halides as the material reacting with ammonia. Specifically with regard to hydride formation, those skilled D in the art will appreciate that metals and metallic compounds such as $CaNi_5$, $LaNi_5$, $FeTi$, $Mg_2Ni$, $V$, $Mg$ etc., can be used as hydride formers.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A gas-containing means comprising
   (A) a pressure vessel with a valved port;
   (B) a first particulate solid inside said pressure vessel capable of combining with said gas which first particulate solid changes in volume with changes in the amount of gas combined therewith;
   (C) a second particulate solid inside said pressure vessel inert to said gas and mixed with said first particulate solid, said second particulate solid having a spatially extended particle structure encompassing free space to thereby exhibit a packing density not greater than 30% of the theoretical density of the solid material comprising said second particulate solid;
   (D) the total volume of (1) the volume of said first particulate solid when in the gas charged condition and (2) the volume of the space occupied by said second particulate solid in the condition under which apparent density is measured being no greater than about 75% of the volume of said pressure vessel; and
   (E) the second particulate solid occupying about 5% to about 40% of the total volume of said first particulate solid when in the gas-charged condition and the volume of space occupied by said second particulate solid in the condition under which apparent density is measured.

2. A gas-containing means as in claim 1 wherein the gas is hydrogen and the first particulate solid is from the group of a metal which combines with hydrogen.

3. A gas-containing means as in claim 1 wherein said second particulate solid is a metallic powder having a ratio of apparent density to theoretical density of less than 0.3.

4. A gas-containing means as in claim 3 wherein said second particulate solid is a nickel powder having an apparent density less than 1.

5. A gas-containing means as in claim 1 wherein the second particulate solid is plurality of pieces of crumpled metal foil.

* * * * *